United States Patent [19]

Kominami et al.

[11] 4,202,291
[45] May 13, 1980

[54] METHOD FOR KEEPING AQUATIC ANIMALS ALIVE OVER LONG PERIOD OF TIME

[75] Inventors: Naoya Kominami; Hirokazu Fukumi; Naokuni Yamawaki; Junji Nomura, all of Fuji, Japan

[73] Assignee: Asahi Kasei Kogyo Kabushiki Kaisha, Tokyo, Japan

[21] Appl. No.: 802,338

[22] Filed: Jun. 1, 1977

[30] Foreign Application Priority Data

Jun. 8, 1976 [JP] Japan .................... 51-66814

[51] Int. Cl.$^2$ .............................................. A01K 63/00
[52] U.S. Cl. ..................................................... 119/3
[58] Field of Search ............................. 119/2, 3, 4, 5

[56] References Cited

U.S. PATENT DOCUMENTS

| | | | |
|---|---|---|---|
| 3,387,587 | 6/1968 | Kelley et al. | 119/2 |
| 3,661,262 | 5/1972 | Sanders | 119/5 |
| 3,726,251 | 4/1973 | Fremont | 119/3 |
| 3,983,843 | 10/1976 | Johnson | 119/5 |
| 4,030,450 | 6/1977 | Hoult | 119/3 |
| 4,052,960 | 10/1977 | Birkbeck et al. | 119/3 |

FOREIGN PATENT DOCUMENTS 711510  6/1965  Canada ........................... 119/3

*Primary Examiner*—Louis G. Mancene
*Assistant Examiner*—Robert P. Swiatek
*Attorney, Agent, or Firm*—Sprung, Felfe, Horn, Lynch & Kramer

[57] ABSTRACT

Aquatic animals can be kept in living condition over a long period of time by placing the aquatic animals in environmental water in a large density of more than 200 kg/m$^3$; maintaining the temperature of the environmental water at a lowest possible level in which it is possible for the aquatic animals to exist; controlling the concentrations of ammonia compounds, water-soluble organic compounds and carbonic acid radical in the environmental water so that their levels do not exceed 20 ppm, 150 ppm and 1,000 ppm, respectively; and regulating the concentration of molecular oxygen dissolved in the environmental water so that it is 3 ppm or more.

20 Claims, 3 Drawing Figures

METHOD FOR KEEPING AQUATIC ANIMALS ALIVE OVER LONG PERIOD OF TIME

The present invention relates to a method for keeping aquatic animals alive over a long period of time. More particularly, the present invention relates to a method for keeping aquatic animals alive in an environmental water over a long period of time without feeding them. The term "environmental water" used herein refers to water in which the live aquatic animals are placed to keep them alive. The environmental water may be supplied from the sea, rivers or city water supply.

In order to keep aquatic animals, which have been caught, for example, fish, shell fish, crustaceans and mollusks, alive for as long as possible, the aquatic animals are usually placed in a fish preserve provided by partitioning a portion of the sea or a river and allowed to move freely. However, recently, some portions of the seas and rivers, particularly, close to big cities, have become heavily polluted. Therefore, the live aquatic animals placed in the fish preserves located in such polluted seas or rivers often die within a short period of time.

In another conventional method, the live aquatic animals are placed in a container through which non-polluted water flows or is recycled, and are allowed to move freely in the container. This method is effective for keeping the aquatic animals alive for a long period of time. However, this conventional method requires a container with a large volume as well as a large amount of fresh water, so that the aquatic animals can move freely in the environmental water in the container. Further, this conventional method requires a continuous supply of fresh water into the container and a continuous discharge of water from the container. The continuous supply and discharge of the environmental water result in the cost of this method being very high.

Generally speaking, a live aquatic animal has energy metabolism. This energy metabolism involves standard energy metabolism and action energy metabolism. Generally, the value of the metabolic action energy is about 8 to 10 times that of the metabolic standard energy. Therefore, in case where the live aquatic animal can move freely, it is necessary to feed the aquatic animals. The feeding causes the costs of the conventional methods to become very high. Further, it is obvious that the conventional methods cannot be utilized for the purpose of transporting live aquatic animals over a long period of time.

An object of the present invention is to provide a method for keeping aquatic animals alive over a long period of time, in a relatively small container, and at a relatively low cost.

Another object of the present invention is to provide a method for keeping aquatic animals alive over a long period of time, without the continuous supply of fresh environmental water.

A further object of the present invention is to provide a method for keeping aquatic animals alive, said method being utilized for transporting the aquatic animals over a long period of time.

The above-mentioned objects can be attained by the method of the present invention. The method of the present invention comprises the operations of:

(A) placing aquatic animals in environmental water in a density larger than 200 kg/m$^3$;

(B) controlling the temperature of the environmental water so that it is maintained as low as the aquatic animals are able to exist;

(C) controlling ammonia compounds in the environmental water so that their total concentration does not exceed 20 ppm;

(D) controlling water-soluble organic compounds in the environmental water so that their total concentration does not exceed 150 ppm;

(E) controlling carbonic acid radical in the environmental water so that it does not exceed a concentration of 1000 ppm, and;

(F) regulating molecular oxygen dissolved in the environmental water so that its concentration is maintained at 3 ppm or more.

The features and advantages of the present invention will be exemplified and more fully explained in the description presented below with reference to the accompanying drawings, in which.

Figure 1:
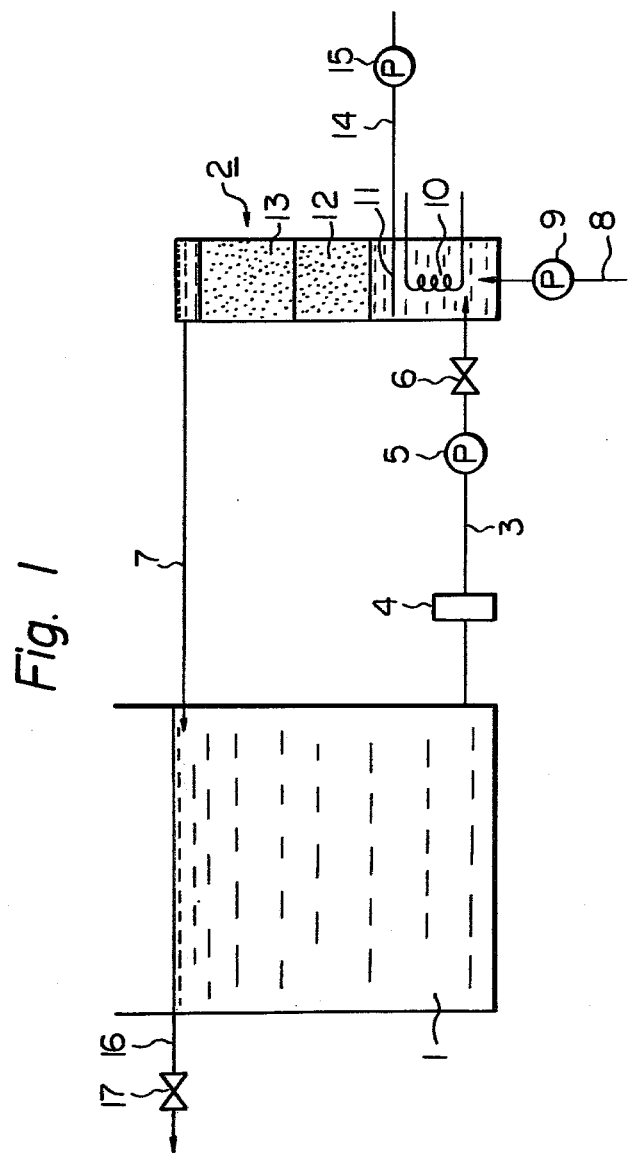
FIG. 1 is an explanatory diagram of an apparatus for effecting the method of the present invention.

It is well known that when live aquatic animals are kept in environmental water, the environmental water is contaminated with excretions of the aquatic animals due to their metabolism. As stated hereinbefore, the metabolism involves standard metabolism and action metabolism, and the value of the metabolic action energy is about 8 to 10 times that of the metabolic standard energy. Also, it is known that the value of the metabolic standard energy of the aquatic animal at a certain temperature can be reduced to one half of the above-mentioned value by lowering the temperature of the aquatic animals to a temperature 10° C. below the above-mentioned certain temperature. Further, it is known that the value of the metabolic action energy of the aquatic animal can be reduced by restricting the movement of the aquatic animals. However, it has been long believed that in order to keep the aquatic animals alive, it is necessary to maintain the aquatic animals at an optimum temperature at which the aquatic animals can exist while allowing the aquatic animals to move freely. It has also been believed that when the live aquatic animals are contained in the environmental water in a relatively large density of 80 to 200 kg/m$^3$, the aquatic animal can be kept alive for only about 50 hours or less.

Contrary to the above, the inventors of the present invention discovered that as long as each of the concentrations of ammonia compounds, water-soluble organic compounds, carbonic acid radical and molecular oxygen in the environmental water is controlled so as to be maintained at a predetermined value, the aquatic animals can be kept alive over a long period of time even if the aquatic animals are restricted in their movement in the environmental water at the lowest possible temperature at which the aquatic animals are able to exist. The present invention is based on this discovery. That is, in the method of the present invention, the aquatic animals are contained in the environmental water in an extremely high density of more than 200 kg/m$^3$, preferably, greater than 200 kg/m$^3$ but not exceeding 700 kg/m$^3$, more preferably, from 250 to 600 kg/m$^3$, and the temperature of the environmental water is maintained at the lowest possible temperature at which the aquatic animals can exist. The large density of the aquatic animals results in restriction in movement of the aquatic animals in the environmental water, and this restriction causes a low consumption of the metabolic action energy of the aquatic animals.

For example, when adult prawns each having an average weight of 30 g are received in the environmental water at a density of 300 kg/m$^3$, the prawns substantially cannot move. The low temperature of the environmental water results in a low consumption of the metabolic standard energy of the aquatic animals. Therefore, under these circumstances, most of the metabolic energy of the aquatic animals is consumed for the purpose of maintaining their life. This results in the life of the aquatic animals being extended. In the method of the present invention, the extended life of the aquatic animal is about 10 to 20 times that in the conventional method.

While the aquatic animals are being kept alive in the environmental water, the aquatic animals consume molecular oxygen dissolved in the environmental water and excrete carbon dioxide ammonia compounds and water-soluble organic compounds, such as urea, uric acid, creatine, creatinine, amino acids, higher fatty acids and trimethyl amine. The aquatic animals cannot be kept alive in environmental water containing certain amounts of the above-mentioned excreted compounds and a very small amount of molecular oxygen.

The supply of the molecular oxygen into the environmental water and the removal of the carbon dioxide from the environmental water can be effected by bringing the environmental water into contact with air so as to allow the molecular oxygen in the air to dissolve into the environmental water and, also, so as to allow the carbon dioxide in the environmental water to be released from the environmental water into the air. The contact of the environmental water with the air may be effected by blowing and bubbling air into the environmental water or by spraying the environmental water into the atmospheric air. These operations are simple and economical.

However, the ammonia compounds are very soluble in water and at a pH of 7 to 9, at which the aquatic animals can exist, most of the ammonia compounds are in the form of ammonium compounds which are non-volatile. Accordingly, the ammonia compounds cannot be removed from the environmental water by the above-mentioned contact of the environmental water with the air. Also, the water-soluble organic compounds, such as, urea, uric acid, creatine, creatinine, amino acids, higher fatty acids and trimethylamine which are non-volatile, cannot be removed by the simple contact of the environmental water with the air.

In the method of the present invention, the aquatic animals are placed in the environmental water in an extremely high density of more than 200 kg/m$^3$, and the temperature of the environmental water is maintained as low as it is possible for the aquatic animals to exist. The high density and the low temperature cause a low consumption of the molecular oxygen and low excretions of carbon dioxide, ammonia compounds and water-soluble organic compounds by the aquatic animals in the environmental water. Also, in the method of the present invention, the concentrations of the ammonia compounds, the water-soluble organic compounds and the carbonic acid radical in the environmental water are controlled so as to be maintained at levels not exceeding 20 ppm, 150 ppm and 1000 ppm, respectively. Also, the concentration of the molecular oxygen dissolved in the environmental water is controlled so as to be maintained at 3 ppm or more.

The above-mentioned controls of the concentrations of the ammonia compounds, water-soluble organic compound, carbonic acid radical and molecular oxygen dissolved in the environmental water may be carried out by continuously flowing fresh water containing less than 20 ppm of the ammonia compounds, less than 150 ppm of the water-soluble organic compounds, less than 1000 ppm of the carbonic acid radical and more than 3 ppm of molecular oxygen, and having a predetermined low temperature, throughout the environment of the aquatic animals. The flow rate of the fresh water may be determined based on the type of aquatic animals. Usually, the flow rate is in a range of from 60 to 1000 liters/hour kg of aquatic animals.

In the case where the environmental water is kept in the environment of the aquatic animals for a long period of time without supplying more fresh environmental water, or in the case where only a portion of the used environmental water is replaced by fresh water, it is necessary to recycle the environmental water through the environment of the aquatic animals and to the outside of that environment. In this case, while the environmental water is outside of the environment of the aquatic animals, the ammonia compounds, water-soluble organic compounds and carbonic acid radical are eliminated from the environmental water, molecular oxygen is dissolved into the environmental water, and the environmental water is adjusted to a predetermined temperature.

The total concentration of the ammonia compounds may be determined by the indophenol method. The total concentration of the water-soluble organic compounds may be determined in accordance with the JIS K-0102, $KM_nO_4$ method at a temperature of 100° C. The concentration of carbonic acid radical may be determined by the Conway microdiffusion analysis method. The concentration of molecular oxygen may be determined by using a DISSOLVED OXYGEN TESTER, Model 151, made by Yellow Spring Co.

The elimination of the ammonia compounds from the environmental water may be effected by bringing the environmental water into contact with a mass of adsorbing material which is capable of allowing the environmental water to flow through the mass. The adsorbing material may be selected from organic polymeric ion-exchange resins; inorganic ion-exchange materials, for example, natural zeolite, synthetic zeolite, aluminium alumino-silicate, magnesium alumino-silicate, silica, alumina, acid clay and activated clay; zirconium type ion-exchange materials, for example, zirconium phosphate, zirconium tungstate and zirconium molybdate; activated carbon; and mixtures of two or more of the above-mentioned materials. These materials are very effective for removal of the ammonia compound even by using them in a relatively small amount.

The above-mentioned adsorbing materials are particularly effective for eliminating the ammonia compound from sea water. When the environmental water is supplied from a river or city water system, the adsorbing material may be an organic polymeric ion-exchange resin, for example, a strong acidic cation-exchange resin, such as, sulfonic acid and salt type cation-exchange resins, and a weak acidic cation-exchange resin, such as, carboxylic acid and salt type cation-exchange resins. The ion-exchange resin may be used in a mixture with the aforementioned adsorbing materials. In this case, the adsorbing material containing the cation-exchange resin can remove a small amount of certain kinds of amine compounds from the environmental water. The ammonia compounds may be eliminated by using a reverse osmosis device or an ion-exchange membrane device.

The elimination of the water-soluble organic compounds from the environmental water may be effected by bringing the environmental water into contact with a mass of adsorbing material which is capable of allowing the environmental water to flow through the mass. The adsorbing material may be selected from natural and synthetic zeolites, activated carbon, silica, silica-alumina, bone black, acid clay, activated clay, aluminium alumino-silicate, magnesium alumino-silicate, and mixtures of two or more of the above-mentioned materials.

The water-soluble organic materials may be eliminated from the environmental water by bringing the environmental water into contact with aluminium hydroxide, so as to allow the organic compounds to coagulate and precipitate together with the aluminium hydroxide and then separating the precipitation from the environmental water.

The elimination of the carbonic acid radical (carbon dioxide dissolved in the environmental water) may be carried out by bringing the environmental water into contact with atmospheric air by any of the conventional methods, for example, a method in which the air is blown and bubbled into the environmental water or a method in which the environmental water is sprayed or ejected into the atmospheric air. By these methods, the carbonic acid radical is released in the form of carbon dioxide from the environmental water into the atmospheric air.

The molecular oxygen can be supplied into the environmental water by bringing the environmental water into contact with air. This contact can be realized by blowing and bubbling air into the environmental water or by spraying or ejecting the environmental water into the atmospheric air. During the time in which the air contacts the environmental water, the molecular oxygen in the air can be dissolved into the environmental water. In place of air, oxygen gas may be used.

The temperature of the environmental water can be adjusted by using any of the conventional methods in which the environmental water is heated or cooled to a desired temperature.

In the method of the present invention, the ammonia compounds and the water-soluble organic compounds may be eliminated, in addition to the afore-mentioned adsorbing methods, by bringing the environmental water into contact with an oxidizing agent. In this method, after the oxidation, any remaining oxidizing agent must be converted into a substance which is non-toxic to the aquatic animals. The oxidizing agent may be selected from hypohalogenic acid compounds, for example, hypochloric compounds or hypobromic acid compounds; hypoiodic acid compounds; hydrogen peroxide; ozone, and mixtures of two or more of the above-mentioned substances.

When hydrogen peroxide or ozone are utilized as an oxidizing agent, a portion of the ammonia compounds is converted into nitric acid and/or nitrous acid. This conversion causes a decrease of pH of the oxidized environmental water. Accordingly, it is necessary to control the environmental water so that its pH is maintained between 6.5 to 9.0.

The most preferable hypohalogenic acid compound is sodium hypochlorite. This compound has a high oxidizing efficiency. The resultant compounds from the oxidation of the ammonia compounds and the organic compounds, and the decomposition product of the sodium hypochlorite are non-toxic to the aquatic animals. Even if the sodium hypochlorite is used for the environmental water of fresh-water aquatic animals, there is no toxicity problem with regard to the aquatic animals.

The conversion of the remaining oxidizing agent after the oxidation may be effected by mixing a reducing agent, for example, sodium thiosulfate or sodium sulfite, into the environmental water containing the remaining oxidizing agent. However, this method has the following disadvantages. Not only does the feeding operation of the reducing agent into the environmental water require a complicated process and apparatus, but it is difficult to control the amount of the reducing agent to be added to the environmental water. Even if the amount of the reducing agent could be exactly controlled, the conversion product from the reducing agent is often toxic or injurious to the aquatic animals. Accordingly, the above-mentioned mixing of the reducing agent is not always preferable for the aquatic animals.

The most preferable method for converting the remaining oxidizing agent into a substance which is non-toxic to the aquatic animals is a catalytical decomposition of the remaining oxidizing agent. The catalyst for decomposing the remaining oxidizing agent may be selected from natural zeolite, synthetic zeolite, aluminium alumino-silicate, magnesium alumino-silicate, silica, alumina, activated clay, acid clay, activated carbon made from coconut shell, activated carbon made from coal, and mixtures of two or more of the above-mentioned materials. In view of the decomposition capacity per unit volume, the most preferable catalyst is the above-mentioned activated carbons, which are effective for all types of oxidizing agents.

In an experiment conducted by the inventors of the present invention, when sea water containing 10 ppm of sodium hypochlorite was brought into contact with 400 ml of natural zeolite of 3 mm in size per particle obtained from Miyagi-Ken, Japan, at a flow rate of 6 liters/hr., the treated sea water contained 3.1 ppm of the sodium hypochlorite. That is, 69% by weight of the sodium hypochlorite was decomposed. In comparison with the natural zeolite, when activated carbon of 3 mm in size per particle was used, the treated sea water contained 0.6 ppm of the sodium hypochlorite. That is, 99.4% by weight of the sodium hypochlorite was decomposed.

The operational conditions to be set forth for eliminating the ammonia compounds include the kind, structure, shape and amount of the adsorbing material, the kind and amount (supply rate) of the oxidizing agent, the structure of the control device in which the elimination is carried out, and the flow rate of the environmental water to be treated (duration of the environmental water in the control device). These conditions should be set forth so as to obtain an optimum result. For example, when sea water containing 2 ppm of ammonia compounds flows at a flow rate of 6 liters/hr. through 280 g (400 ml) of natural zeolite of 3 mm in size per particle, and the initial concentration of sodium hypochlorite added to the sea water is 27.8 ppm, the treated sea water contains 0.21 ppm of the ammonia compounds. When 135 g (300 ml) of synthetic aluminium alumino-silicate of 3 mm in size per particle, having a ratio by weight of Al$_2$O$_3$:SiO$_3$ of 23:77, are used in place of the natural zeolite, the treated sea water contains 0.28 ppm of the ammonia compounds.

The operational conditions for eliminating the water-soluble organic compounds should be set forth in the same manner as stated for the operational conditions for eliminating the ammonia compounds. For example, when sea water containing 10 ppm of the water-soluble organic compounds flows at a flow rate of 6 liters/hr through 160 g (400 ml) of activated carbon and the initial concentration of the sodium hypochlorite is 10 ppm, the resultant sea water contains 1.8 ppm of the organic compounds.

The treating conditions for the environmental water may be set forth based on the kind and amount of the aquatic animals, the amount of the environmental water to be treated, the excretions of the ammonia compounds and organic compounds, and the resistance of the aquatic animals to the ammonia and organic compounds. For example, in case where 1.3 kg of live prawns, having an average weight of about 30 g, are placed in 3.6 liters of the environmental sea water, and the environmental water is recycled at a flow rate of 6 liters/hr, the ammonia compounds and the water-soluble organic compounds excreted by the prawns can be almost completely eliminated by using 280 g of natural zeolite of 3 mm in size per particle for eliminating the ammonia compounds, and 160 g of activated carbon of 3 mm in size per particle for eliminating the water-soluble organic compounds, and adjusting the initial concentration of the sodium hypochlorite in the environmental water to 27.8 ppm. That is, the environmental water can be maintained at a concentration of the ammonia compound of 1 ppm or less and at a concentration of the water-soluble organic compounds of 10 ppm or less. In the above-mentioned case, the concentration of the residual sodium hypochlorite in the treated environmental water is 4.6 ppm. The residual amount of the sodium hypochlorite can be almost completely decomposed by bringing the treated environmental water into contact with 240 g of activated carbon of 3 mm in size per particle.

In the method of the present invention, the operation for eliminating the ammonia compounds and the operation for eliminating the water-soluble organic compounds may be carried out in an optional order.

The method of the present invention can be applied to any kind of the aquatic animals, for example, adults and fries of (A) aquatic animals of Class Osteichthys: for example, sea breams such as *Chrysophrys major, Oplegnathus fasciatus* and *Mylies maceocephalus;* pink salmons such as *Oncarbynchus nerka* and *Salmogairdneric irideus;* sweet fish, namely, *Plecoglossus altivelis;* loach, namely, *Misgurnus anguillicaudatus;* crucian, namely, *Carassium carcassius;* carp, namely, *Cyprinus carpio;* eel, namely, *Anguilla japonica;* conger eel, namely, *Conger japonicus;* horse mackerels such as *Trachurus japonicus* and *Caranx delicatissmus;* sea bass, namely *Lateolabrax japonicus;* Puffer such as *Fugurubripes rubripes;* and flat fishes such as *Paralichthys olivacenes, Limanda herzensteini* and *Limanda yokohamae;* (B) aquatic animals of Arthropoda Class Crustacea: for example, prawns such as *Penaeus japonicus, Penacus semisulcatus* and *Metapeneus joyneri;* shrimps such as *Sergestes lucens, Pandalus kessleri* and *Pandalus borealis;* lobsters such as *Panulirus japonicus;* and crabs such as *Erimacrus isenbeckii, Parlithodes camtchatica, Chionoecetes pitio, Portunus tribuberculatus* and *Macrocheria kaempferic;* (C) aquatic animals of Mollusca Class Lamellibranchia: for example, oysters, such as, *Osteria gigas;* scallops such as *Pecten yessoensis,* ask shells such as *Anadara broughtonii;* cockle, namely, *Fulvia mutica;* and hard clams such as *Meretrix meretrix lusoria;* (D) aquatic animals of Mollusca Class Gostropoda: for example, abalones such as *Haloitis gigantea, Haliotis sieboldi, Haliotis kamtschatkana, Haliotis japonica* and *Haliotis discus;* and (E) aquatic animals of Echinodermata; for example, sea-urchins such as Echinoidea and sea-cucumbers such as Holoihuroidea; (F) onomats such as *Amyda sinensis;* (G) edible frogs such as *Pana catesbiana;* and (H) edible snails such as *Hilix ponatia.*

By utilizing the method of the present invention, the aquatic animals can be kept alive for a long period of several days to one month. Before the present invention, it was never possible to keep aquatic animals alive for the above-mentioned long period of time. Accordingly, it is obvious that the method of the present invention is very valuable and practical.

Figure 2:
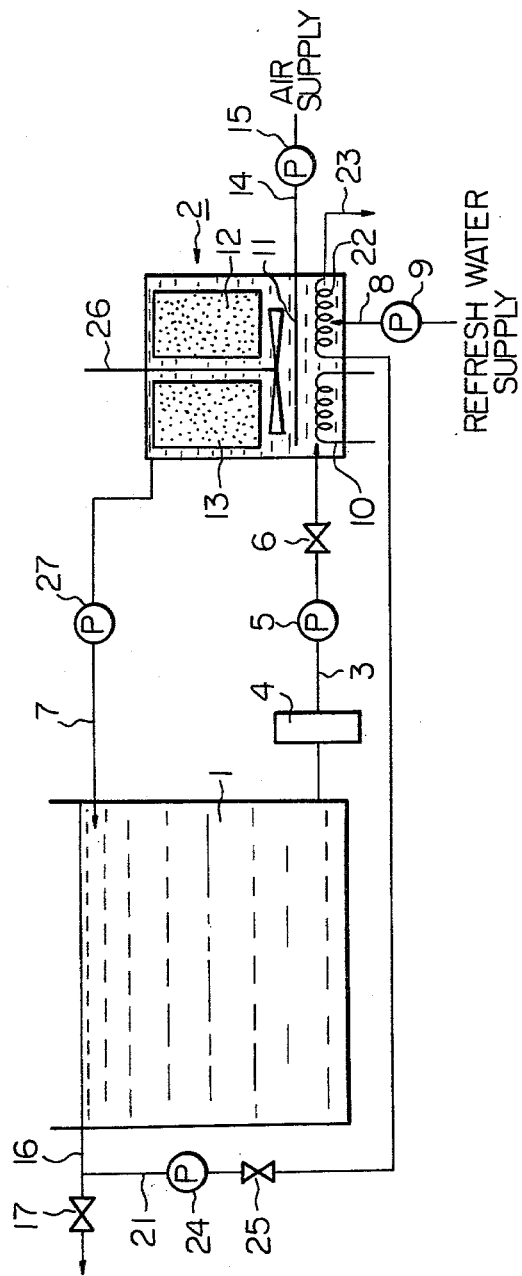
FIG. 2 is an explanatory diagram of another apparatus for effecting the method of the present invention.
Figure 3:
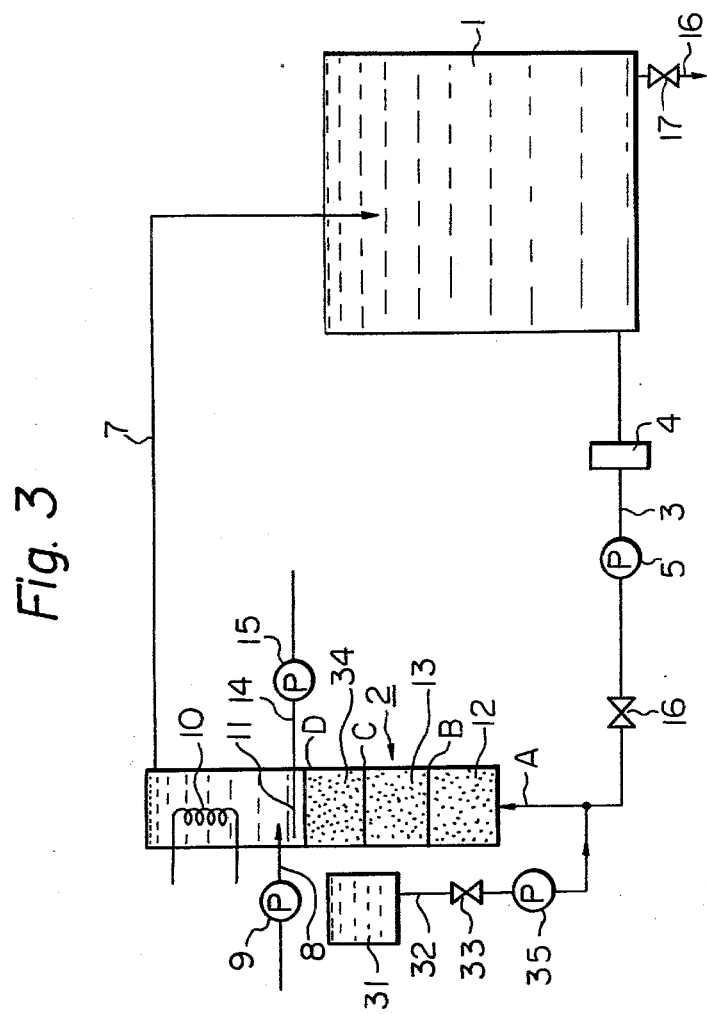
FIG. 3 is an explanatory diagram of a further apparatus for effecting the method of the present invention.

The method of the present invention can be effected, for example by using the apparatus as shown in the accompanying drawings wherein:

FIGS. 1 to 3 are schematic views of different embodiments of apparatus for carrying out the purposes of the present invention.

Referring to FIG. 1 of the drawings, a water tank 1 for containing aquatic animals and environmental water has an inside volume large enough to contain aquatic animals at a density of more than 200 kg per m$^3$ of the environmental water. A control path 2 for containing a portion of the environmental water withdrawn from the water tank 1 is located outside the water tank 1. The bottom portion of the water tank 1 is connected to an inlet portion of the control path 2 through a withdraw pipe line 3 having a pump 5 for withdrawing a portion of the environmental water from the water tank 1 and for introducing the withdrawn portion of water it into the control path 2. The withdraw pipe line 3 may be provided with a filter 4 for removing solid materials from the environmental water and a valve 6 for opening and closing the pipe line 3. The outlet portion of the control path is connected to the water tank 1 through a return pipe line 7 through which the withdrawn portion of the environmental water can be returned back into the water tank 1. Accordingly, the environmental water can be recycled through the water tank 1, the withdraw pipe line 3, the pump 5, the control path 2 and the return pipe line 7. The outlet end of the return pipe line 7 may be opened at any portion of the water tank 1 as long as the returned water can be uniformly distributed in the water tank 1 and, then, evenly withdrawn at the inlet end of the withdraw pipe line 3. If it is necessary, the return pipe line 7 can be provided with a pump and a valve which are not shown in FIG. 1. The control path 2 is connected at its inlet portion to a supply source of fresh environmental water (not shown in FIG. 2) through a supply pipe 8 and a pump 9. The control path 2 contains therein a means 10 for controlling the temperature of the environmental water in the control path 2 at the lowest possible temperature at which the aquatic animals are able to exist, a means 11 for bringing the environmental water in the control path into contact with air, a means 12 for eliminating ammonia compounds, and a means 13 for eliminating water-soluble organic compounds from the environmental water.

The temperature control means 10 may be composed of a heat-exchanger through which a heating medium or a cooling medium can flow as shown in FIG. 1. The temperature control means 10 is preferably located in the inlet portion of the control path 2.

The means 11 for bringing the environmental water into contact with air is preferably composed of an air pipe 14 connected to an air blowing pump 15 as shown in FIG. 1. An end portion of the air pipe 14 inserted into the control path 2 has a number of holes through which air bubbles are blown into the environmental water flowing in the control path 12.

The means 12 for eliminating the ammonia compounds may be a mass of adsorbing material which allows the environmental water to flow therethrough. The means 13 for eliminating the water-soluble organic compounds may also be a mass of adsorbing material which allows the environmental water to flow therethrough.

The water tank 1 may have a discharge pipe 16 for discharging the environmental water from the water tank 1. The discharge pipe 16 may be provided with a valve 17 for opening and closing the discharge pipe 16, and may be located at an upper part of the water tank 1 for discharging the portion of the environmental water which has overflowed from the water tank 1, as shown in FIG. 1.

In the apparatus shown in FIG. 2, the discharge pipe 16 has a branch pipe line 21 connected to a heat-exchanger 22 located within the inlet portion of the control path 2. When the valve 17 is closed, a portion of the environmental water overflowed from the water tank 1 is introduced into the heat-exchanger 22 for causing heat-exchange to occur between the overflowed environmental water and the fresh environmental water supplied into the inlet portion of the control path 2 through the supply pipe 8 and pump 9. Then, the portion of the overflowed environmental water is discharged through a pipe 23 to the outside of the apparatus. The branch pipe line 21 may be provided with a pump 24 and a valve 25. In the control path 2 shown in FIG. 2, the ammonia compound eliminating means 12 and the water-soluble organic compounds eliminating means 13 are arranged in parallel to each other. A stirrer 26 is also disposed in the control path 2 for agitating the environmental water in the control path 2 and for causing the environmental water to pass through the eliminating means 12 and 13. The return pipe line 7 has a pump 27 for forcibly sending the environmental water from the control path 2 into the water tank 1.

In the apparatus shown in FIG. 3, a tank 31 for storing a solution of an oxidizing agent is connected to an outlet end portion of the withdraw pipe line 3 through a pipe 32 and a valve 33 for causing an oxidizing agent solution to be admixed into the withdrawn portion of the environmental water. In the apparatus shown in FIG. 3, the environmental water containing the oxidizing agent flows through the control path 2. In the control path 2, the environmental water comes into contact with the ammonia compounds eliminating means 12, the water-soluble organic compounds eliminating means 13 and finally, the means 34 for decomposing the remaining oxidizing agent. In the decomposing means 34, the remaining oxidizing agent is converted into a substance which is non-toxic to the aquatic animals. Thereafter, the environmental water is brought into contact with air by the air contacting means 11, and the temperature of the environmental water is adjusted to a desired temperature by the means 10.

Hereinafter, the invention of the present application is illustrated in detail by the following examples.

EXAMPLE 1 AND COMPARISON EXAMPLES 1 THROUGH 6

In each of the Example 1 and Comparison Examples 1 through 6, 1665 prawns (*Penaeus japonicus*) each having an average weight of about 30 g were placed in a water tank having an inside volume of 125 liters (50 cm×50 cm×50 cm). Next, the water tank containing the prawns was filled with fresh sea water. The density of the prawns in the environmental sea water was about 400 kg/m$^3$.

In Example 1, fresh sea water was introduced into a control tank and regulated to a temperature of about 10° C., and air was blown and bubbled into the fresh sea water. In order to keep the prawns alive in the water tank, the environmental water in the water tank was continuously replaced by fresh sea water introduced from the control tank at a rate of 1.25 m$^3$/hr. The environmental water discharged from the water tank was introduced into a heat-exchanger located within the control tank for cooling the fresh sea water in the control tank, and then the environmental water was discharged therefrom.

Ten days after the start of the experiment, the concentrations of ammonia compounds, water-soluble organic compounds, carbonic acid radical, and molecular oxygen in the environmental water discharged from the water tank were determined.

In Comparison Example 1, the same procedures as those used in Example 1 were carried out except that 400 prawns were placed in the environmental water of the water tank at a density of 96 kg/m$^3$.

In Comparison Example 2, the same procedures as those used in Example 1 were effected except that the temperature of the environmental water was adjusted to 25° C.

In Comparison Example 3, the same procedures as those used in Example 1 were carried out except that the total concentration of the ammonia compounds in the environmental water was regulated to 21 ppm by adding ammonium chloride to the fresh sea water in the control tank.

In Comparison Example 4, the same procedures as those used in Example 1 were carried out except that the total concentration of the water-soluble organic compounds in the environmental water was regulated to 160 ppm by adding the excretion prawns to the fresh sea water in the control tank.

In Comparison Example 5, the same operations as those used in Example 1 were conducted except that the concentration of the carbonic acid radical in the environmental water was controlled to 1200 ppm by adding sodium carbonate to the fresh sea water in the control tank.

In Comparison Example 6, the same procedures as those used in Example 1 were performed except that the concentration of molecular oxygen in the environmental water was controlled to 2.5 ppm by stopping air from being blown into the fresh sea water in the control tank.

The results of the above-mentioned experiments are shown in Table 1.

Table 1

| Items | Example 1 | Comparison Examples 1 | 2 | 3 | 4 | 5 | 6 |
|---|---|---|---|---|---|---|---|
| Density (kg/m$^3$) | 400 | 96 | 400 | 400 | 400 | 400 | 400 |
| Temperature (°C.) | 10 | 10 | 25 | 10 | 10 | 10 | 10 |
| Concentration (ppm) 10 days after start of experiment | | | | | | | |
| Ammonia compounds | 2 | 1.8 | 3 | 21 | 2 | 2 | 2 |
| Water-soluble organic compounds | 12 | 10 | 15 | 12 | 160 | 12 | 12 |
| Carbonic acid radical | 165 | 160 | 185 | 180 | 165 | 1200 | 165 |
| Molecular oxygen | 6.5 | 7.0 | 5.5 | 6.5 | 6.5 | 6.5 | 2.5 |
| Percentage of prawns kept alive | | | | | | | |
| 1 day after start of experiment | 100 | 100 | 98 | 92 | 98 | 96 | 96 |
| 2 days after start of experiment | 100 | 96 | 94 | 88 | 95 | 92 | 86 |
| 3 days after start of experiment | 100 | 10 | 92 | 91 | 88 | 84 | 80 |
| 5 days after start of experiment | 99 | 83 | 84 | 72 | 83 | 76 | 76 |
| 10 days after start of experiment | 97 | 74 | 70 | 48 | 78 | 62 | 72 |

EXAMPLE 2

Procedures identical to those in Example 1 were carried out in Example 2, except that 1000 young red sea breams (chrysophrys major) each having an average weight of 40 g were placed in the water tank 1 at a density of 320 kg per m$^3$ of the environmental water and the temperature of the environmental water was controlled to 8° C. The results of Example 2 are shown in Table 2.

EXAMPLE 3

The same procedures as those used in Example 1 were effected except that 1600 young carps having an average weight of 25 g were placed in the water tank 1 at a density of 320 kg per m$^3$ of the environmental water supplied from a city water system, and the environmental water was adjusted to a temperature of 15° C. The results of Example 3 are shown in Table 2.

Table 2

| Items | Example 2 | Example 3 |
|---|---|---|
| Type of fish | Red sea bream | Carp |
| Average weight of fish (g) | 40 | 25 |
| Temperature of environmental water (°C.) | 8 | 15 |
| Concentration (ppm) 10 days after start of experiment | | |
| Ammonia compounds | 2.5 | 2.0 |
| Water-soluble organic compounds | 14 | 15 |
| Carbonic acid radical | 170 | 65 |
| Molecular oxygen | 6.4 | 6.8 |
| Percentage of fish kept alive | | |
| 1 day after start of experiment | 100 | 100 |
| 2 days after start of experiment | 100 | 100 |
| 3 days after start of experiment | 100 | 99 |
| 5 days after start of experiment | 98 | 98 |
| 10 days after start of experiment | 97 | 97 |

EXAMPLE 4

The apparatus shown in FIG. 2 was employed in Example 4. The water tank 1 exhibiting an inside volume of 27 liters (30 cm×30 cm×30 cm) was charged with fresh sea water and 320 prawns (Penaeus japonicus) each having an average weight of 30 g. The density of the prawns in the environmental water was 350 kg/m$^3$. The withdraw pipe line 3 and the return pipe line 7 were made of polyvinyl chloride pipes. The environmental water withdrawn from the water tank 1 was adjusted to a temperature of about 10° C. in the control path 2 and then returned back into the water tank 1. In the control path 2, air was blown and bubbled into the environmental water for maintaining the molecular oxygen and the carbonic acid radical dissolved in the environmental water at levels of between 5 and 8 ppm and 150 and 190 ppm, respectively. In order to eliminate the ammonia compounds from the environmental water, about 45 kg of natural zeolite particles each of from 0.3 to 0.5 cm in size were packed in a net made of polyvinylidene chloride and placed into the control path 2. Also, in order to eliminate the water-soluble organic compounds from the environmental water, 9 kg of activated carbon particles each of from 0.2 to 0.5 cm in size were packed in a net made of polyvinylidene chloride and immersed into the environmental water in the control path 2. The above-mentioned adsorbing materials were replaced with fresh ones at intervals of every 12 hours for maintaining the ammonia compounds and the water-soluble organic compounds in the environmental water at total concentrations of 3 ppm or less and 15 ppm or less, respectively. The persentages of the animals kept alive are shown below.

| Period in which animals are kept alive (day) | Percent |
|---|---|
| 18 | 96 |
| 18 | 95 |
| 30 | 93 |

The changes in appearance and appetite of the prawns during the experimental period of time were observed over a period of 30 days. No changes in both conditions were found. It was also found that the loss in weight of the live prawns during the experimental period of 30 days was 4% based on the weight of the live prawns at the start of the experiment. From this fact it is obvious that the commercial loss due to keeping the prawns alive for a long period of time is very small.

EXAMPLES 5 AND 6 AND COMPARISON EXAMPLES 7 THROUGH 9

In Example 5, the same procedures as those used in Example 4 were effected except that 50 adult conger eels each having an average weight of 260 g were placed in the water tank 1 so that the density of the conger eels became 480 kg per m³ of the environmental water. Furthermore, the temperature of the environmental water was adjusted to that of 10° C., and the adsorbing materials for the ammonia compounds and the water-soluble organic compounds were replaced by fresh ones at intervals of every 12 hours.

In Example 6, the same procedures as those used in Example 5 were effected except that the adsorbing materials were replaced by fresh ones at intervals of every 24 hours. In Comparison Examples 7 through 9, the same procedures as those used in Example 5 were repeated except that the adsorbing materials for the ammonia compounds and the water-soluble organic materials were respectively replaced by fresh ones at intervals of every 24 hours and 36 hours in Comparison Example 7, every 24 hours and 12 hours in Comparison Example 8 and sodium carbonate was added to the environmental water in Comparison Example 9.

The results of Examples 5 and 6 and Comparison Examples 7 through 9 are shown in Table 3.

Table 3

| Items | Example 5 | Example 6 | Comparison Example 7 | Comparison Example 8 | Comparison Example 9 |
|---|---|---|---|---|---|
| Concentration (ppm) | | | | | |
| 10 days after start of experiment | | | | | |
| Ammonia compounds | 4.2 | 12.8 | 21.0 | 5.5 | 5.8 |
| Water-soluble organic compounds | 26 | 48 | 45 | 160 | 33 |
| Carbonic acid radical | 380 | 620 | 450 | 360 | 1050 |
| molecular oxygen | 6.5 | 5.8 | 6.8 | 6.2 | 4.5 |
| Percentage of fish kept alive | | | | | |
| 1 day after start of experiment | 100 | 100 | 100 | 100 | 100 |
| 3 days after start of experiment | 100 | 99 | 94 | 96 | 92 |
| 5 days after start of experiment | 100 | 96 | 88 | 90 | 83 |
| 10 days after start of experiment | 98 | 92 | 75 | 82 | 74 |
| 15 days after start of experiment | 94 | 90 | 60 | 71 | 55 |

EXAMPLES 7 THROUGH 13

The apparatus shown in FIG. 3 was employed in each of Examples 7 through 13.

In Example 7, test water containing 2 ppm of ammonia compounds and 20 ppm of water soluble organic compounds was prepared in the water tank 1 by polluting fresh sea water with dead flatfishes (*Paralichthys olivaceus*) and dead carps (*Cyprinus carpio*).

Referring to the control path 2 shown in FIG. 3, the means 12 for containing an adsorbing agent for the ammonia compounds was filled with 280 g of natural zeolite particles each of 3 mm in size, and the means 13 for containing an adsorbing agent for the water-soluble organic compounds was charged with 160 g of activated carbon particles each of 3 mm in size. In addition, the means 34 for receiving an agent for decomposing an oxidizing agent was charged with 160 g of actuated carbon particles each of 3 mm in size. An aqueous solution of sodium hypochlorite as an oxidizing agent was contained in the tank 31.

The test water was recycled at a flow rate of 6 liters/hr. through the water tank 1, the control path 2, the withdraw pipe line 3 and the return pipe line 7. The sodium hypochlorite solution was mixed with the test water at the outlet end portion of the withdraw pipe line 3. The test water forwarded to the control path 2 passed through zones 12, 13 and 34, and then was adjusted to a temperature of 10° C. by the temperature control means 10. The returned test water was polluted again with the dead flatfish and dead carps in the water tank 1.

After recycling the test water for hours, a portion of the test water was sampled at a point A in the outlet end portion of the withdraw pipe line, and subjected to the determination of the concentration of the oxidizing agent in the test water.

Another portion of the test water was sampled at a point B in the outlet end portion of the stratum containing the adsorbing agent for the ammonia compounds, and subjected to the determination of the concentration of the ammonia compounds.

Still another portion of the test water was sampled at a point C in the outlet end portion of the stratum containing the adsorbing agent for the water-soluble organic compounds, and subjected to the determination of the concentration of the water-soluble organic compounds in the test water.

A further portion of the test water was sampled at a point D in the outlet end portion of the stratum containing the decomposing agent for the oxidizing agent, and subjected to the determination of the oxidizing agent in the test water.

The eliminating rates (mg/hr) of the ammonia compounds and of the water-soluble organic compounds were calculated from the results of the above-mentioned determinations.

In Example 8, the same procedures as those used in Example 7 were effected except that 200 g of aluminium alumino-silicate particles having a ratio of $Al_2O_3:SiO_2$ of 23:75 and a particle size of 3 mm each were used in place of the natural zeolite as the adsorbing agent for the ammonia compounds.

In Example 9, the same procedures as those used in Example 7 were effected, except that the test water was recycled at a rate of 15 liters/hr., and 280 g of synthetic zeolite (4A type) were used instead of the natural zeolite as the adsorbing agent for the ammonia compounds.

In Example 10, the same procedures as those used in Example 7 were carried out, except that 560 g of aluminium alumino-silicate were used in place of the natural zeolite as the ammonia compound-adsorbing agent. Furthermore, 410 g of the activated carbon were used for adsorbing the water-soluble organic compounds, 410 g of the activated carbon were used for decomposing the remaining oxidizing agent, and hydrogen peroxide in place of the sodium hypochlorite as used as the oxidizing agent.

In Example 11, the same operations as those used in Example 10 were conducted except that 160 g of a weak acid type cation-exchange resin were used in place of the aluminium alumino-silicate, and water from a city water system was used in place of the sea water.

In Example 12, the same procedures as those used in Example 7 were carried out, except that water from a city water system was used instead of sea water, and a small amount of about 140 g of natural zeolite was employed therein.

In Example 13, the same procedures as those used in Example 7 were performed except that 320 g of aluminium alumino-silicate were used as the decomposing agent for the remaining oxidizing agent, in place of the activated carbon. The results of Example 13 are shown in Table 4.

Table 4 clearly shows that even with very small concentrations of the ammonia compounds (2 ppm) and of the water-soluble organic compounds (20 ppm), these compounds could be eliminated with a relatively high degree of efficiency. Also, it is evident that the remaining oxidizing agent, that is, sodium hypochlorite and hydrogen peroxide, could be decomposed with a high degree of efficiency. Furthermore, it is evident that the present invention is effective not only for application to salt water (sea water) but also for application to fresh water (river water or city water).

ammonia compounds and the water-soluble organic compounds in the environmental water will become as high as 98 ppm and 112 ppm, respectively.

In the control path 2 in FIG. 3, the means 12 was charged with 200 g of synthetic aluminium alumino-silicate having a ratio of $Al_2O_3:SiO_2$ of 23:77 and a size of 3 mm per particle; the means 13 was charged with 160 g of activated carbon of 3 mm in size per particle; and the means 34 was charged with 240 g of activated carbon of 3 mm in size per particle. A solution of 3.25% by weight of sodium hypochlorite was stored in the tank 31. The environmental water was recycled through the water tank 1, control path 2, withdraw pipe line 3 and return pipe line 7 at a recycling rate of 6 liters/hr.

The sodium hypochlorite solution was introduced into the outlet end portion of the withdraw pipe line 3 at a flow rate of 5 ml/hr by means of a feed pump (not shown in FIG. 3) to be mixed with the environmental water.

It was determined that the concentrations of the portions of the environmental water located just upstream of the entrance of the control path 2 and just downstream of the outlet end of the means 34 were 27.8 ppm and 0.3 ppm, respectively.

The concentrations of the ammonia compounds, the

Table 4

| Ex. No. | Test water | Recycling rate (liter /hr) | Adsorbing agent for Ammonia compounds | Adsorbing agent for Water organic compounds | Decomposing agent | Oxidizing agent | Concentration (ppm) of Oxidizing agent at point A | Concentration (ppm) of Ammonia compounds at point B | Concentration (ppm) of Water-soluble organic compounds at point C | Concentration (ppm) of Oxidizing agent at point D | Eliminating rate (mg/hr) of Ammonia compounds | Eliminating rate (mg/hr) of Water-soluble organic compounds |
|---|---|---|---|---|---|---|---|---|---|---|---|---|
| 7 | Sea water | 6 | Natural zeolite 280g | Activated carbon 160g | Activated carbon 160g | NaOCl | 27.8 | 0.7 | 9.8 | 0.1 | 7.8 | 61.2 |
| 8 | Sea water | 6 | Aluminium alumino--silicate 200g | Activated carbon 160g | Activated carbon 160g | NaOCl | 27.8 | 0.6 | 9.9 | 0.1 | 8.4 | 60.6 |
| 9 | Sea water | 15 | Synthetic zeolite 280g | Activated carbon 160g | Activated carbon 160g | NaOCl | 27.8 | 1.3 | 12.4 | 0.8 | 10.5 | 11.4 |
| 10 | Sea water | 6 | Aluminium alumino--silicate 560g | Activated carbon 410g | Activated carbon 410g | $H_2O_2$ | 24.0 | 1.1 | 13.0 | 0.6 | 5.4 | 42.0 |
| 11 | City water | 6 | Weak acid cation--exchange resin 160g | Activated carbon 410g | Activated carbon 410g | $H_2O_2$ | 12.0 | 0.4 | 7.0 | 0.3 | 9.6 | 78.0 |
| 12 | City water | 6 | Natural zeolite 140g | Activated carbon 160g | Activated carbon 160g | NaOCl | 18.2 | 0.2 | 8.2 | 0.1 | 10.8 | 70.8 |
| 13 | Sea water | 6 | Natural zeolite 280g | Activated carbon 160g | Aluminium alumino--silicate 320g | NaOCl | 27.8 | 0.7 | 9.8 | 0.4 | 7.8 | 61.2 |

EXAMPLE 14

The apparatus shown in FIG. 3 was employed in Example 14, 1.2 kg of live prawns having an average weight of 30 g were placed in a water tank having an inside volume of 3 liters, and then the water tank was filled with sea water. The density of the prawns was 400 kg/m³. The prawns (1.2 kg) excreted 2.1 mg/hr of ammonia compounds and 2.4 mg/hr of water-soluble organic compounds. Accordingly, if the environmental water is kept for one week without eliminating these compounds, it is expected that the concentrations of water soluble organic compounds, the molecular oxygen and the carbonic acid radical in the environmental water, and the percentage of the prawns kept alive based on the initial number thereof were 0.8 ppm, 7.6 ppm, 6.8 ppm, 260 ppm and 96% respectively, at the stage of a week after the start of the experiment, and 1.0 ppm, 8.2 ppm, 6.6 ppm, 480 ppm and 93% respectively, at the stage of two weeks after the beginning of the experiment.

The dead prawns were removed from the environmental water as soon as they were found.

In the comparison of the above-determined respective concentrations of 0.8 ppm and 7.6 ppm of the ammonia compounds and the water-soluble organic compounds with the preexpected respective values of 98 ppm and 112 ppm of the same, it is evident that the method and the apparatus of the present invention are very effective for clarifying the environmental water of aquatic animals.

The prawns kept for two weeks were in good health.

What we claim is:

1. A method for keeping aquatic animals alive over a long period of time substantially without feeding them and in a high density in environmental water, comprising the steps of:
   (A) placing aquatic animals in environmental water;
   (B) controlling the temperature of said environmental water so that said temperature is maintained at the lowest possible temperature range in which said aquatic animals are able to exist;
   (C) controlling ammonia compounds in said environmental water so that the total concentration thereof does not exceed 20 ppm;
   (D) controlling water-soluble organic compounds in said environmental water so that the total concentration thereof does not exceed 150 ppm;
   (E) controlling carbonic acid radical in said environmental water so that it does not exceed a concentration of 1000 ppm and;
   (F) regulating molecular oxygen dissolved in the environmental water so that its concentration is maintained at 3 ppm or more, the concentrations of said ammonia compounds and water-soluble organic compounds in said environmental water being controlled by bringing said environmental water into contact with a hypohalite so as to oxidize said ammonia compounds and said organic compounds therein while the hypohalite is converted to halide non-toxic to said aquatic animals.

2. A method as claimed in claim 1, wherein the density of said aquatic animals is in a range higher than 200 $kg/m^3$ but not exceeding 700 $kg/m^3$.

3. A method as claimed in claim 2, wherein the density of said aquatic animals is in a range of from 250 to 600 $kg/m^3$.

4. A method as claimed in claim 1, wherein the concentrations of the ammonia compounds and the water-soluble organic compounds are additionally controlled by continuously flowing fresh environmental water having a concentration of the ammonia compounds of less than 20 ppm and a concentration of the water-soluble organic compounds of less than 150 mm through the environment of said aquatic animals.

5. A method as claimed in claim 1, wherein the concentration of said ammonia compounds in said environmental water is additionally controlled by adsorbing said ammonia compounds with an adsorbing material.

6. A method as claimed in claim 5, wherein said adsorbing material is selected from organic polymeric cation-exchange resins, natural zeolite, synthetic zeolite, aluminium alumino-silicate, magnesium alumino-silicate, zirconium phosphate, zirconium tungstate, zirconium molybdate, activated carbon and mixtures of two or more of the above-mentioned materials.

7. A method as claimed in claim 6, wherein said organic polymeric cation-exchange resin is selected from sulfonic acid and salt type strong acidic cation-exchange resins and from carboxylic acid and salt type weak acidic cation-exchange resins.

8. A method as claimed in claim 5, wherein said adsorption is carried out by flowing said environmental water through a path containing a mass of said adsorbing material.

9. A method as claimed in claim 1, wherein the concentration of said water-soluble organic compounds in said environmental water is additionally controlled by adsorbing said organic compounds with an adsorbing material.

10. A method as claimed in claim 9, wherein said adsorbing material is selected from activated carbon, silica, silica-alumina, bone black, acid clay, activated clay and mixtures of two or more of the above-mentioned materials.

11. A method as claimed in claim 9, wherein said adsorption is carried out by flowing said environmental water through a path containing therein said adsorbing material.

12. A method as claimed in claim 1, wherein the concentration of said water-soluble organic compounds in said environmental water is additionally controlled by coagulating and precipitating said organic compounds with aluminium hydroxide and separating the precipitant from said environmental water.

13. A method as claimed in claim 1, wherein said carbonic acid radical is removed from said environmental water by bringing said environmental water into contact with the atmospheric air so as to allow said carbonic acid radical to be released in the form of carbon dioxide from said environmental water into the atmosphere.

14. A method as claimed in claim 13, wherein said contact of said environmental water with atmospheric air is effected by blowing the atmospheric air into said environmental water.

15. A method as claimed in claim 1, wherein the concentration of said oxygen in said environmental water is controlled by bringing said environmental water into contact with air so as to allow oxygen to dissolve into said environmental water.

16. A method as claimed in claim 15, wherein said contact of said environmental water with air or oxygen gas is effected by blowing air or oxygen gas into said environmental water.

17. A method as claimed in claim 1, wherein any remaining hypohalite oxidizing agent in said environmental water is converted into a substance which is non-toxic to said aquatic animals.

18. A method as claimed in claim 17, wherein the initial oxidizing operation is effected simultaneously with an adsorbing operation for said ammonia compounds and said organic compounds with an adsorbing material or materials.

19. A method as claimed in claim 17, wherein the conversion of said remaining oxidizing agent is effected by bringing said remaining oxidizing agent into contact with an activated carbon, natural zeolite, synthetic zeolite, aluminium alumino-silicate, magnesium alumino-silicate or a mixture of two or more of the above-mentioned materials.

20. A method as claimed in claim 1, wherein a portion of said environmental water is withdrawn, said withdrawn portion of said environmental water is treated in steps (B) through (F) and, thereafter, said treated portion of said environmental water is returned back to the environment of said aquatic animals.

* * * * *